UNITED STATES PATENT OFFICE.

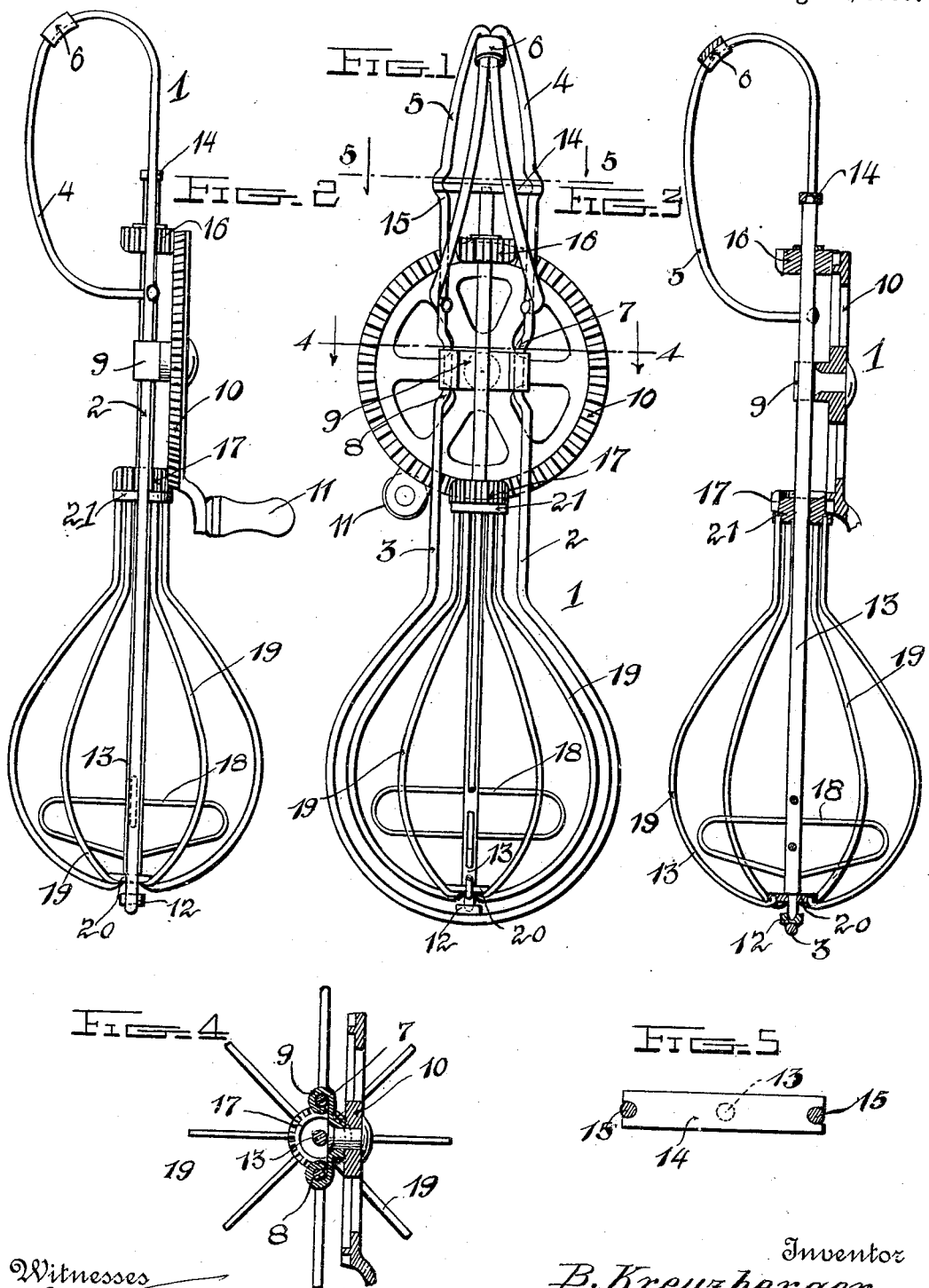

BARTLETT KREUZBERGER, OF MERIDEN, CONNECTICUT.

EGG-BEATER.

932,294. Specification of Letters Patent. Patented Aug. 24, 1909.

Application filed October 15, 1908. Serial No. 457,895.

*To all whom it may concern:*

Be it known that I, BARTLETT KREUZBERGER, a citizen of the United States, residing at Meriden, in the county of New Haven and State of Connecticut, have invented certain new and useful Improvements in Egg-Beaters; and I do declare the following to be a full, clear, and exact description of the invention, such as will enable others skilled in the art to which it appertains to make and use the same.

This invention relates to improvements in egg beaters, and the principal object is to provide a simply constructed strong egg beater capable of being readily cleaned by disassembling the parts.

With these and other objects in view, the invention consists of certain novel features of construction, combination and arrangement of parts, as will be more fully described and particularly pointed out in the appended claim.

In the accompanying drawings, Figure 1 is a front elevation of my improved egg beater, Fig. 2 is a side elevation, Fig. 3 is a central vertical section thereof, Fig. 4 is a horizontal section taken on the line 4—4 of Fig. 1, and Fig. 5 is a horizontal section taken on the line 5—5 of Fig. 1.

In the accompanying drawings, which are prepared for illustrative purposes and, therefore, are not drawn to scale, the frame of my improved egg beater is designated by the numeral 1, and comprises a single piece of heavy wire bent intermediately of its ends and bowed at its middle portion to form a pear-shaped loop having upwardly extending parallel arms 2 and 3, which terminate at their upper ends in looped handle members 4 and 5, the ends of which are twisted on the parallel arms 2 and 3. These members 4 and 5 are connected together by a metallic strap 6, to form a handle for the device extending at right angles to the body thereof. The parallel arms 2 and 3 are bent at 7 and 8 to form seats for the ends of a clamping plate 9, to which is journaled the beveled gear wheel 10, having a crank 11.

The lower end of the frame 1 is provided with a bearing block 12 in which, the lower end of a shaft 13 is disposed. The upper end of this shaft 13 is operatively mounted in a bearing plate 14, which is detachably secured on the upper end of the frame 1 between the arms 2 and 3. The upper ends of the arms 2 and 3 are formed with seats 15, and the bearing plate 14 has its ends cut away to form notches to engage the seats 15. The upper end of the shaft 13 is provided with a pinion 16, which is adapted to engage with the gear 10, and a second pinion 17, is loosely mounted on said shaft at a point intermediate of its ends. A small beater comprising a plurality of wire wings 18, arranged cross-wise, is secured to the lower end of the shaft 13, and a second beater comprising a plurality of wire sections 19 secured at one end to a bearing block 20 arranged near the lower end of the shaft 13, and at their other ends to a second bearing block 21, rigidly secured to the pinion 17.

The clamping plate 9 is provided with inwardly bent hooklike ends designed to engage the parallel arms 2 and 3 of the frame 1. The shaft 16 is adapted to be removed from the frame 1 by compressing the lower bowed portion of the frame 1 to increase the distance between the bearing block 12 and the bearing plate 14, thereby allowing said shaft with the beaters mounted thereon to be readily removed and cleaned of any accumulated material.

The frame of my improved beater is preferably made of spring metal, and the handle which is formed integral therewith cannot become detached from said frame through frequent and hard usage, and enables a person to firmly grasp the device. When the gear wheel 10 is rotated the beater 18 will be rotated in a direction opposite to the rotation of the beater 19, and the beater 18 is preferably arranged on the lower end of the shaft so that the highest efficiency in the beating operation may be obtained.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim and desire to secure by Letters-Patent, is:—

In an egg beater, the combination of a frame composed of a single piece of spring metal bent intermediately of its ends and bowed to form a pear-shaped laterally compressible loop having spaced parallel arms extending from the small end thereof, the ends of said arms being bent downwardly and then inwardly to form loops with their terminals secured to said arms intermediately of their ends, a beater mounted to rotate in said pear-shaped loop and means for operating said beater.

In testimony whereof I have hereunto set my hand in presence of two subscribing witnesses.

BARTLETT KREUZBERGER.

Witnesses:
W. R. C. STEINHOLTZ,
T. H. MAGUIRE.